United States Patent [19]
Artz

[11] Patent Number: 5,292,176
[45] Date of Patent: Mar. 8, 1994

[54] INFLATABLE CHILD VEHICLE SEAT

[75] Inventor: Larry Artz, Wilton, Conn.

[73] Assignee: Babystar, Brooklyn, N.Y.

[21] Appl. No.: 48,753

[22] Filed: Apr. 16, 1993

Related U.S. Application Data

[63] Continuation-in-part of Ser. No. 939,521, Sep. 4, 1992.
[51] Int. Cl.$^5$ .................. A47C 31/00; A47C 5/12; A47D 1/00
[52] U.S. Cl. ................ 297/250.1; 297/452.41; 297/467; 297/484; 297/DIG. 3
[58] Field of Search ............... 297/250, DIG. 3, 484, 297/467, 468, 454, 250.1, 452.41

[56] References Cited

U.S. PATENT DOCUMENTS

| | | | |
|---|---|---|---|
| 3,265,438 | 8/1966 | Regan et al. | 297/DIG. 3 |
| 4,627,659 | 12/1986 | Hall | 297/DIG. 3 |

FOREIGN PATENT DOCUMENTS 776934  6/1957  United Kingdom ......... 297/DIG. 3

*Primary Examiner*—Alexander Grosz
*Attorney, Agent, or Firm*—Amster, Rothstein & Ebenstein

[57] ABSTRACT

A child seat device, for use in a vehicle having a seatbelt for securing the child seat device to the vehicle seat, has an inflatable child seat which includes an inflatable bottom panel, an inflatable back panel upstanding from the rear of the bottom panel, and a pair of opposed, laterally spaced inflatable sidewall panels. Each of the sidewall panels has a back portion projecting forwardly from a respective side of the back panel and a bottom portion projecting upwardly from a respective side of the bottom panel. An inflatable brace, disposed in each of the sidewall panels intermediate the back and bottom sidewall portions, limits pivotal movement of the back and bottom sidewall portions towards each other. Each of the braces defines a single interior air chamber having at most limited gaseous communication with the bottom, back and sidewall panels. Alternatively, a substantially rigid frame is secured to the back panel for movement therewith as a unit, thereby to limit pivotal movement of the back and bottom panels towards each other. The frame defines a pair of apertures configured and dimensioned to receive therethrough a seatbelt, thereby to secure the device to the vehicle seat. A releasable harness maintains the torso of a child intermediate the sidewall panels.

10 Claims, 17 Drawing Sheets

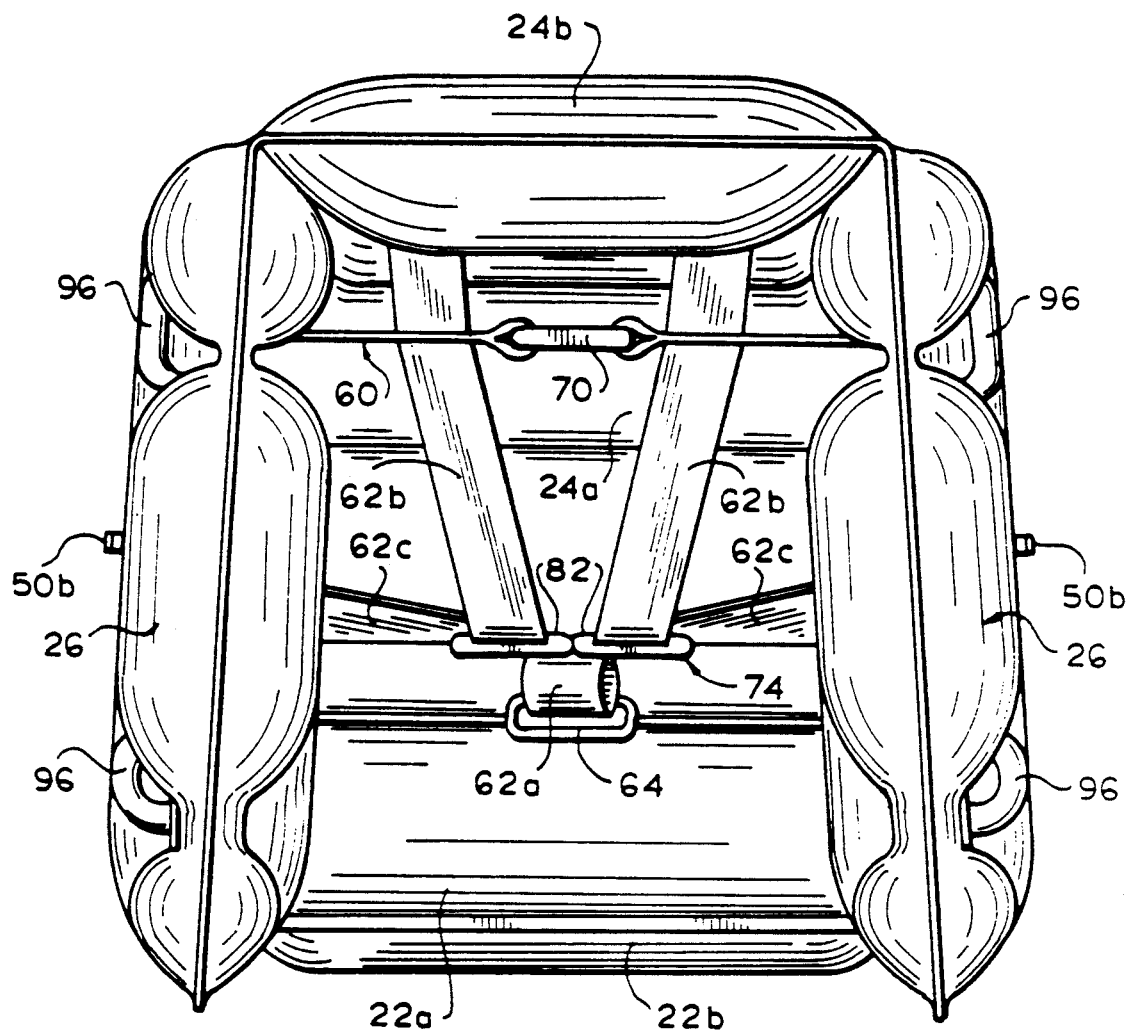
F I G. 4

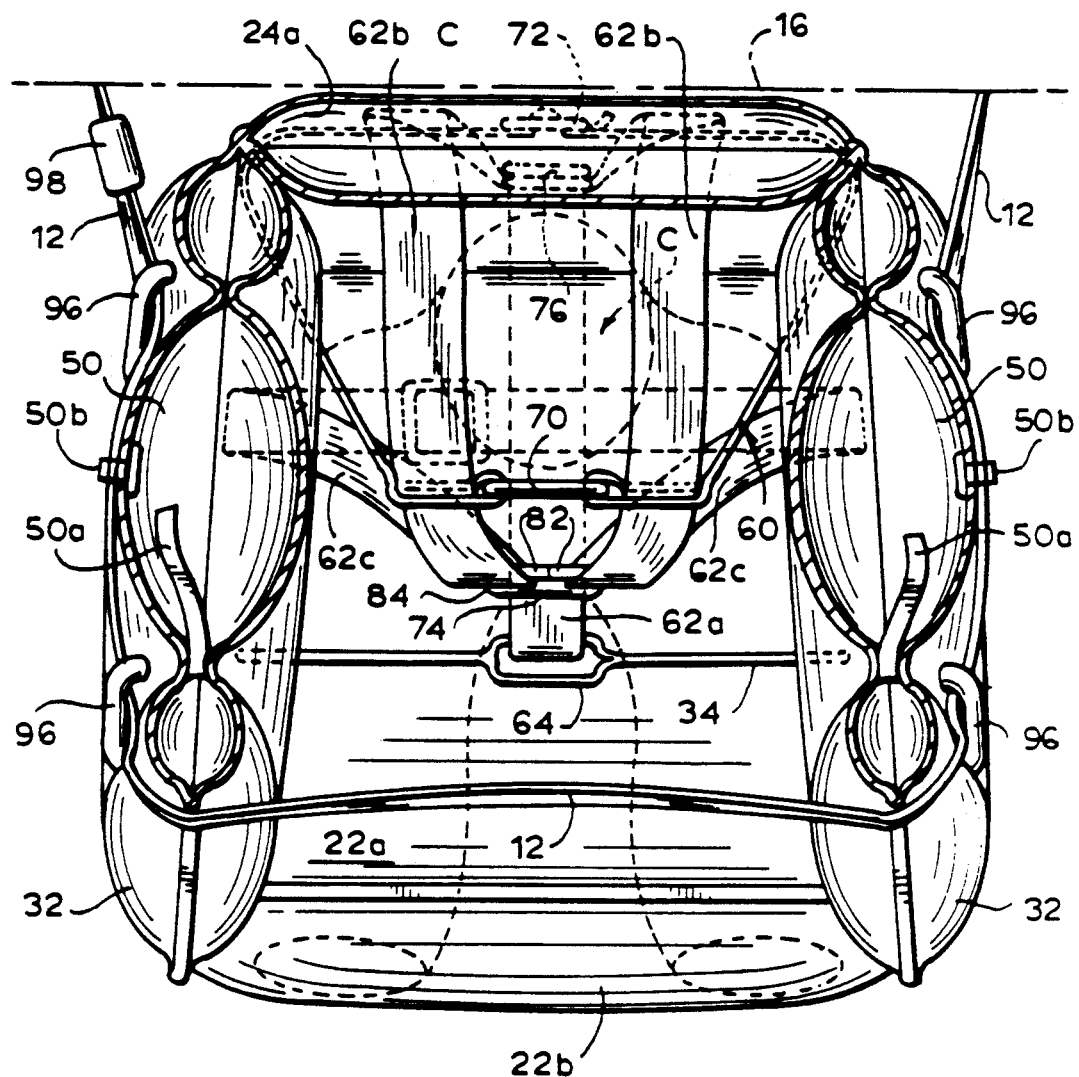
F I G. 10

INFLATABLE CHILD VEHICLE SEAT

CROSS-REFERENCE TO RELATED APPLICATION

This application is a continuation-in-part of U.S. patent application Ser. No. 939,521, filed Sep. 4, 1992.

BACKGROUND OF THE INVENTION

The present invention relates to a vehicle seat for children, and more particularly, to such a seat which is inflatable and deflatable.

Child vehicle seats are well known in the art and are designed to accommodate and protect a child sitting in a vehicle. The seat is disposed parallel to the motion of the vehicle—that is, it is mounted on the car seat extending along a longitudinal axis of the vehicle. Preferably, a child seat (as opposed to an infant seat) is configured so that the child faces forwardly toward the front end of the vehicle.

Conventional child vehicle seats are formed of cushioning or padded material, either with or without a rigid frame for supporting the same. Such a seat represents a compromise between the high level of protection desirably afforded to the child in the event of an accident, and the high level of comfort desirably provided for the child during normal use of the seat (that is, when no accident is imminent). Such a seat fails to provide the child with the highest level of protection possible in the event of an accident because the structure necessary to provide the highest level of protection would be uncomfortable for the child during normal use of the seat.

Another problem with the conventional child vehicle seats is that they are bulky and heavy and thus difficult to store where storage space is at a premium. Thus, while parents may provide their vehicle with a child vehicle seat, when the child is taken for rides in the vehicles of those who do not have a child vehicle seat, the child is deprived of the extra protection afforded by a child vehicle seat. For example, grandparents who only see the child occasionally will probably not have such a seat in their vehicle as a routine matter and may not have room for storage of such a device within their home.

Accordingly, it is an object of the present invention to provide in one embodiment a child vehicle seat device which, under normal driving conditions, provides a maximum level of comfort to the child within, yet, in the event of an accident, affords a maximum level of protection for the child within, regardless of its comfort, during the instant of the accident.

Another object is to provide such a device which in one embodiment is easily and compactly stored when not in use.

A further object is to provide such a device which is economical to manufacture and easy to maintain.

A still further object is to provide such a device which in one embodiment is light in weight.

SUMMARY OF THE INVENTION

It has been found that the above and related objects of the present invention are obtained in a child seat device for use in a vehicle having a seatbelt for securing the child seat device to the vehicle seat. The device comprises an inflatable child seat including an inflatable bottom panel, an inflatable back panel upstanding from the rear of the bottom panels, and a pair of opposed, laterally spaced inflatable sidewall panels. Each of the sidewall panels has a back portion projecting forwardly from a respective side of the back panel and a bottom portion projecting upwardly from a respective side of the bottom panel. The seat further includes bracing means, disposed in each of the sidewall panels intermediate the back and bottom sidewall portions, for limiting pivotal movement of the back and bottom sidewall portions towards each other, each of the bracing means preferably being inflatable and defining a single interior air chamber having at most limited gaseous communication with the bottom, back and sidewall panels. The device also includes releasable harness means for maintaining the torso of a child intermediate the sidewall panels.

In a preferred embodiment, at least an upper portion of the back panel is forcibly pivotable downward and forwards, but the bracing means limit pivotal movement of the back and bottom panels towards each other. The bottom, back and sidewall panels define together a single interior panel air chamber, and each of the bracing means air chambers, once inflated, is independent of the panel air chamber. The bottom, back and sidewall panels and the bracing means are commonly inflatable. The bottom, back and sidewall panels are commonly deflatable, and the bracing means are deflatable independently of each other and the panels.

The present invention further encompasses a child seat device for use in a vehicle having a seatbelt for securing the child seat device to the vehicle seat. The device comprises an inflatable child seat including an inflatable bottom panel defining an aperture therethrough, an inflatable back panel upstanding from the rear of the bottom panel and defining an aperture therethrough, and a pair of opposed, laterally spaced inflatable sidewall panels. Each of the sidewall panels has a back portion projecting forwardly from a respective side of the back panel and a bottom portion projecting upwardly from a respective side of the bottom panel. The device also comprises a continuous harness system including first releasable strap means for maintaining the upper torso of a child in the inflatable child seat intermediate the back sidewall portions, and second releasable strap means extending through both the back panel aperture and the bottom panel aperture and passing intermediate the legs of the child for maintaining the lower torso of the child intermediate the bottom sidewall portions. The first and second strap means are secured together at at least one point.

In a preferred embodiment, the harness system includes first strap means extending in a horizontal plane around the back panel intermediate the back and back sidewall panels, thereby to encircle the upper torso of a child in the inflatable child seat, and first fixture means for releasably fastening two portions of the first strap means together across the chest of the child. It further includes second strap means and second fixture means for releasably fastening two portions of the second strap means together between the legs of the child. The second strap means extends at least in a vertical Plane from the second fixture means downwardly through the bottom panel aperture, then forwardly through the at least one back panel aperture, and into the second fixture means, thereby to maintain the lower torso of the child in the inflatable child seat. The first and second strap means are fixedly secured together at at least one point.

Preferably, the second strap means extends from the second fixture means downwardly through the bottom panel aperture, rearwardly and around the intersection of the bottom and back panels, upwardly and then forwardly through the at least one back panel aperture, and downwardly into the second fixture means. Optimally, a portion of the second strap means extends vertically around the bottom panel and intermediate the bottom and bottom sidewall panels and through the second fixture means, thereby to assist in maintaining the lower torso of the child intermediate the sidewall panels.

The inflatable child seat optimally defines a plurality of passageways for passage therethrough of the first and second strap means, thereby to maintain each of the first and second strap means in the desired orientation. The second strap means includes two lengths thereof extending from the second fixture means downwardly through the bottom panel aperture, then forwardly through the back panel aperture and downwardly into the second fixture means, each of the lengths of the second strap means being fixedly secured to a respective laterally spaced portion of the first strap means. The first and second strap means are fixedly secured together in front of the chest of a child in the inflatable child seat.

Optimally, each of the first and second strap means includes means for varying the effective length thereof independently of the other of the strap means, and each of the sidewall panels defines a passageway for passage therethrough of a vehicle seatbelt.

The present invention additionally encompasses a second embodiment incorporating, alternatively or in addition to the bracing means, a substantially rigid frame secured to the back panel for movement therewith as a unit. The frame defines a pair of apertures configured and dimensioned to receive therethrough a seatbelt, thereby to secure the device to the vehicle seat.

In a preferred embodiment, the apertures are horizontally spaced apart and extend laterally of the back panels. The frame is disposed adjacent the back of the back panel and extends over substantially the entire width of the back panel and at least 50% of the height of the back panel. Preferably the frame defines a periphery having a pair of spaced apart vertical side members, top and bottom transverse members connecting the vertical side members, at least one intermediate transverse member intermediate the top and bottom transverse members and connecting the vertical side members, and a pair of ears extending laterally outwardly from the vertical side members and defining the apertures.

Opposite ends of the harness means are secured to the frame, preferably to different transverse members of the frame.

BRIEF DESCRIPTION OF THE DRAWING

The above and related objects, features and advantages of the present invention, will be more fully understood by reference to the following detailed description of the presently preferred, albeit illustrative, embodiments of the present invention when taken in conjunction with the accompanying drawing wherein:

FIGS. 4 and 5 are front elevational and rear elevational views thereof, respectively;

FIG. 10 is a sectional view taken along the line 10—10 of FIG. 6;

DETAILED DESCRIPTION OF THE PREFERRED EMBODIMENTS

Figure 6:
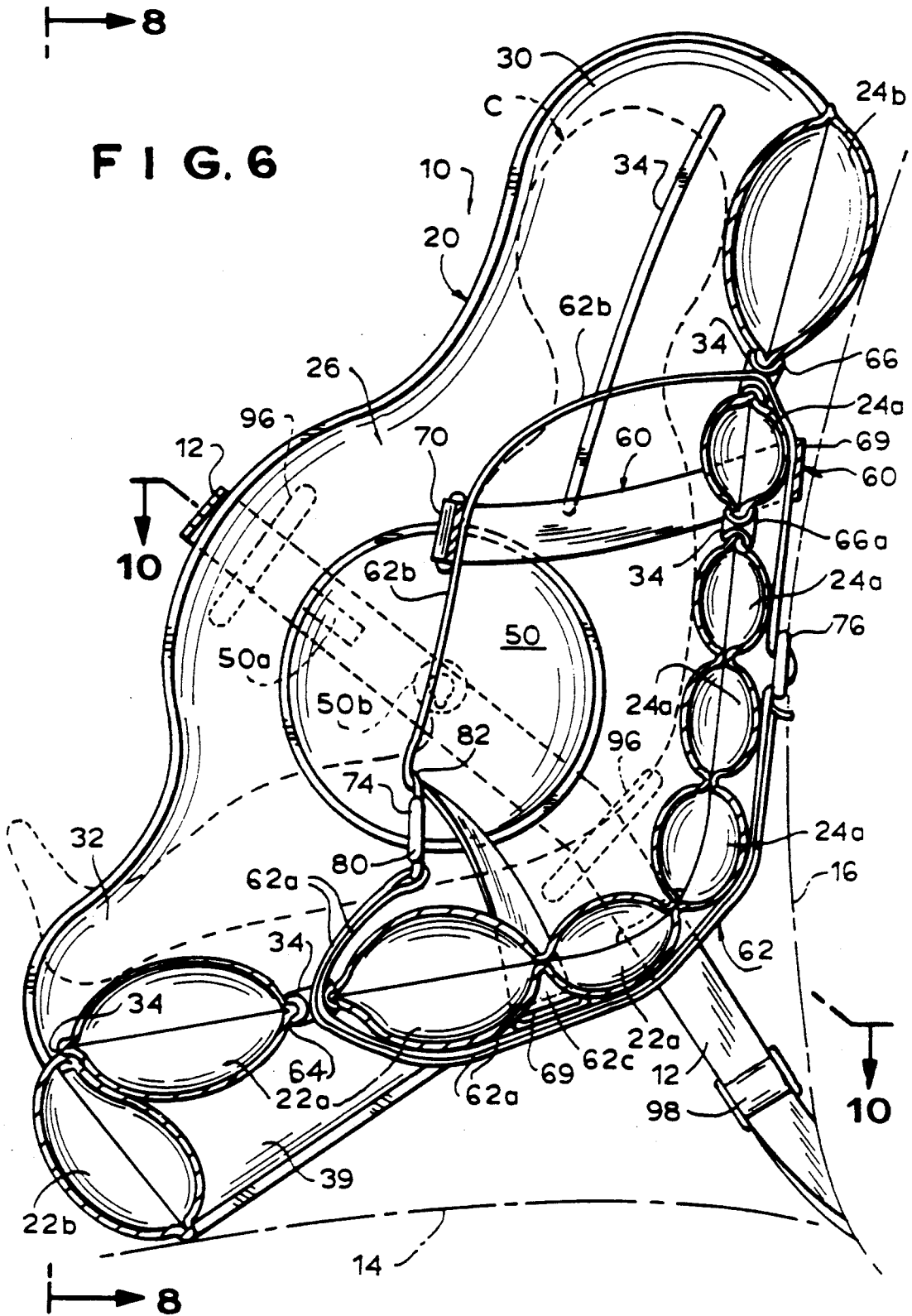
FIG. 6 is a sectional view thereof taken along the line 6—6 of FIG. 2 showing the device as secured to a vehicle seat by a seatbelt and a child (illustrated in phantom line) disposed therein.

Referring now to the drawing, and in particular to FIGS. 1–5 thereof, therein illustrated is a child seat device according to the present invention, generally designated by the reference numeral 10. As best seen in FIG. 6, the device 10 is intended for use in a vehicle (not shown) having a seatbelt 12 for securing the device 10 to the vehicle seat (illustrated in phantom line) formed by the generally horizontal bottom cushion 14 and the generally vertical back cushion 16.

More particularly, the device 10 comprises an inflatable child seat generally designated 20, including an inflatable bottom panel generally designated 22, an inflatable back panel generally designated 24 and upstanding from the rear of the bottom panel 22, and a pair of opposed, laterally spaced, inflatable sidewall panels generally designated 26. Each of the sidewall panels 26 has a back portion 30 projecting forwardly from a respective side of the back panel 24 and a bottom portion 32 projecting upwardly from a respective side of the bottom panel 22. The bottom, back and sidewall panels 22, 24, 26 define a single interior air chamber, as best seen in FIG. 6.

However, as illustrated, the bottom panel 22 is preferably subdivided into a series of three short, thick sub-chambers and a fourth sub-chamber 22b, which depends downwardly from the front of the bottom panel 22, thereby to provide some support for the calves of the child in the seat 20. Similarly, as also illustrated, the back panel 24 is preferably divided into a series of five short, thick sub-chambers 24a and a single somewhat wider chamber 24b disposed at the top of the back panel 24. Each of the sub-chambers 22a, 22b of the bottom panel 22 are in gaseous communication, and each of the sub-chambers 24a, 24b of the back panel 24 are in gaseous communication. Furthermore, the sub-chamber 22a at the back of the bottom panel 22 and the sub-chamber adjacent 24a at the bottom of the back panel 24 are in gaseous communication, thereby ensuring that all of the sub-chambers, 22a, 22b, 24a, 24b are in gaseous communication. As the short, thick sub-chambers extending from one sidewall 26 to the other sidewall 26 are formed by well-known techniques, such as thermal or ultrasonic welding, the gaseous communication between sub-chambers is easily accomplished by limiting the length of the weld lines 34 so that they do not completely separate adjacent sub-chambers. Clearly the panels 22, 24 may be comprised of a greater or lesser number of sub-chambers. Preferably each sidewall panel 26 further defines a shaping skirt 39 connecting one side of depending sub-chamber 22b to the full length of the bottom panel 22.

The back and bottom sidewall portions 30, 32 are also in gaseous communication with each other through intermediate or communicating sidewall portions 26a. The sidewall panels 26 are secured to the bottom and back panels 22, 24 by weld lines 36, but the weld lines 36 do not extend the full length of the intersection of the panels 22, 24 with the sidewall panel 26, so that there is gaseous communication between the sidewall panels 26 and both the bottom and back panels 22, 24. Accordingly, a single inflation valve 40 disposed on one of the sidewall panels 26 (or one of the other panels) enables common inflation and deflation of the bottom, back and sidewall panels 22, 24 and 26 (including the various sub-chambers 22a, 22b, 24a, 24b).

The back panel 24 is substantially longer than the bottom panel 22 (that is, the back panel 24 extends vertically a distance greater than the distance the bottom panel 22 extends forwardly), and there is a tendency for at least the upper portion of the back panel 24 to be forcibly displaced forwardly and downwardly (towards the bottom panel 22) when a vehicle makes an abrupt stop. This type of forward and downward movement of the upper portion of back panel 24 compresses the child within the seat 20, and can apply undesirable forces to the sensitive area of the child's neck. In a conventional child seat having a rigid frame, the frame is designed to withstand this collapsing motion. Even in a conventional child seat without a frame, the padding or cushion material of which the sidewall panels are formed limits the amount of collapsing movement that can occur since the distribution of the cushion material within the seat is substantially fixed and the cushioning material is compressible to only a limited degree. On the other hand. in an inflatable child seat, the air is highly compressible and capable of relocating throughout the seat as necessary, so that this collapsing movement poses a real problem.

Accordingly, in order to overcome this collapsing motion, the present invention provides a bracing means 50, disposed in each of the sidewall panels 26 intermediate the back and bottom sidewall portions 30, 32, for limiting pivotal movement of the back and bottom sidewall portions 30, 32 towards each other and hence pivotal movement of the back and bottom panels 24, 22 towards each other. Preferably, as illustrated, each of the bracing means 50 is inflatable and defines a single interior air chamber having at most limited gaseous communication with the common panel air chamber of the bottom, back and sidewall panels 22, 24 and 26. When inflated, each bracing means 50 is in the form of a cylinder, preferably with hemispherical ends. As illustrated, each bracing means 50 has a cylindrical cross section with semi-spherical ends extending inwardly from the sidewall panel 26 toward the child at one end and outwardly from the sidewall panel 26 at the other end. Other regular geometric shapes may be employed, but preferably the bracing means 50 occupies a substantial portion of the intersection of the back and bottom sidewall portions 30, 32 without, however, interfering with gaseous communication therebetween via the intermediate sidewall panel portions 26a. If desired, a non-inflatable bracing means may be employed instead of the inflatable bracing means—e.g., a rigid metal or plastic member disposed intermediate the back and bottom sidewall portions to preclude buckling. In this case the rigid bracing means should be small enough that it does not interfere with the compact folding of the deflated seat 20.

As noted, the bracing means 50 has, at most, limited gaseous communication with the panels 22, 24, 26. In the Preferred embodiment illustrated in FIG. 6, a one-way inflation-only valve 50a extends from each sidewall panel 26 into its respective bracing means 50 to permit the bracing means 50 to be commonly inflated with the bottom, back and sidewall panels 22, 24, 26. Valve 50a is shown as a collapsible valve which is open only when the air pressure in the sidewall panel 26 is greater than the pressure within the bracing means 50; the air pressure "opens" the collapsible valve 50a so that, under the pressure differential, air passes from the sidewall panel 26 into the bracing means 50. However, once the pressure within the bracing means 50 is as high as the pressure within the sidewall panel 26, this pressure collapses and "closes" the valve 50a and thereby terminates gaseous communication between the sidewall panel 26 and the bracing means 50 until the sidewall panel pressure again exceeds the bracing means pressure. Such collapsible one-way inflation-only valves are well known in the inflatable arts.

As the panels are being inflated via the panel valve 40, the bracing means 50 is inflated to a similar pressure. Once inflated, however, the bracing means air chamber is essentially independent of the panel air chambers due to collapse of the valve 50a. Thus, while the back, bottom and sidewall panels 22, 24, 26 are commonly deflatable via the valve 40, the bracing means 50 are not deflatable via the valve 40. Instead they are deflatable only via their own deflation valves 50b, independently of each other and of the panels. If desired, the one-way inflation-only collapsible valve 50a and the one-way deflation-only valve 50b may be dispensed with, and each bracing means 50 may be inflatable and deflatable only via its own two-way inflation/deflation valve.

Figure 1:
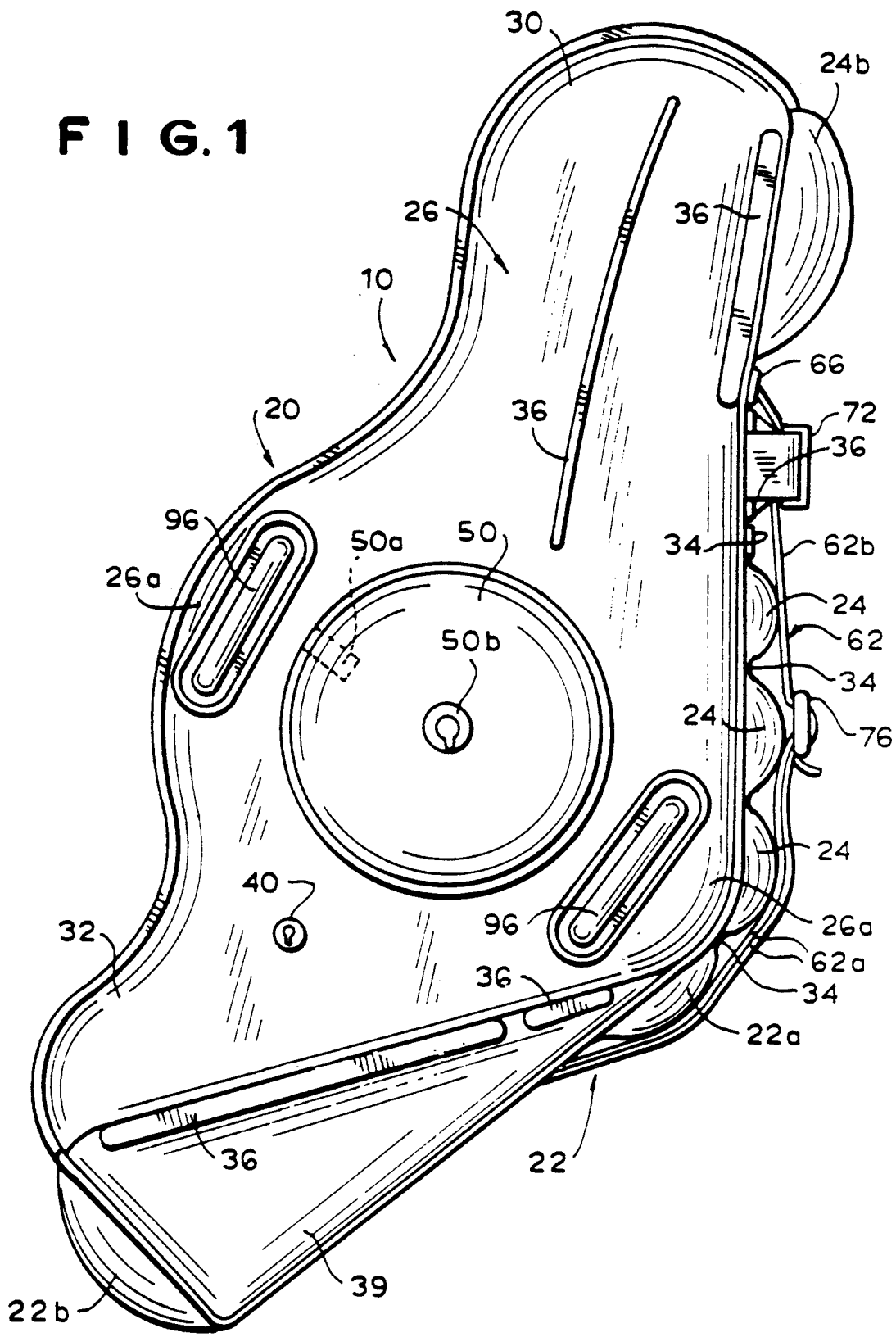
FIGS. 1, 2 and 3 are side elevational, top plan and bottom plan views, respectively, of a child seat device according to the present invention.
Figure 2:
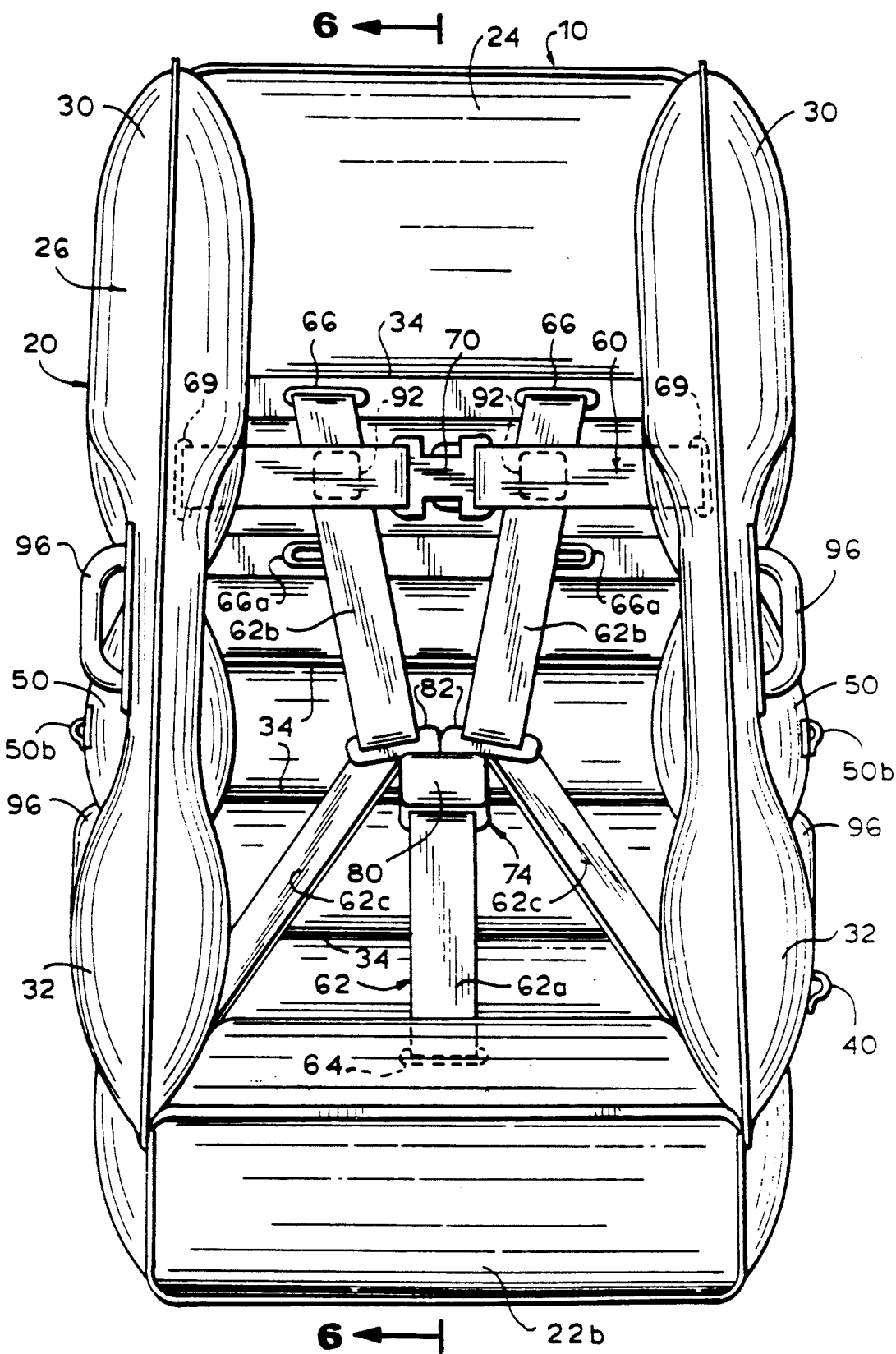
Figure 3:
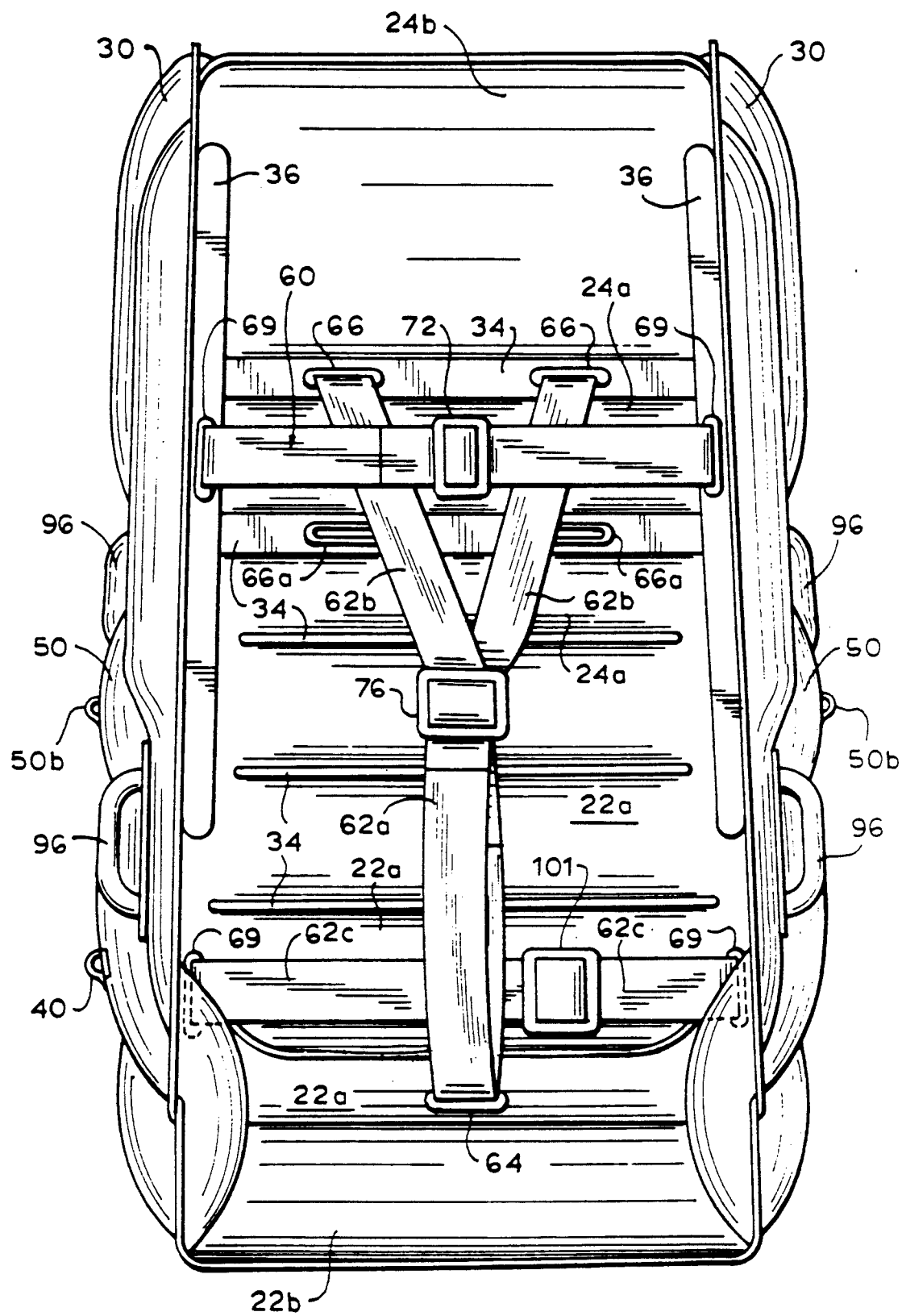
Figure 5:
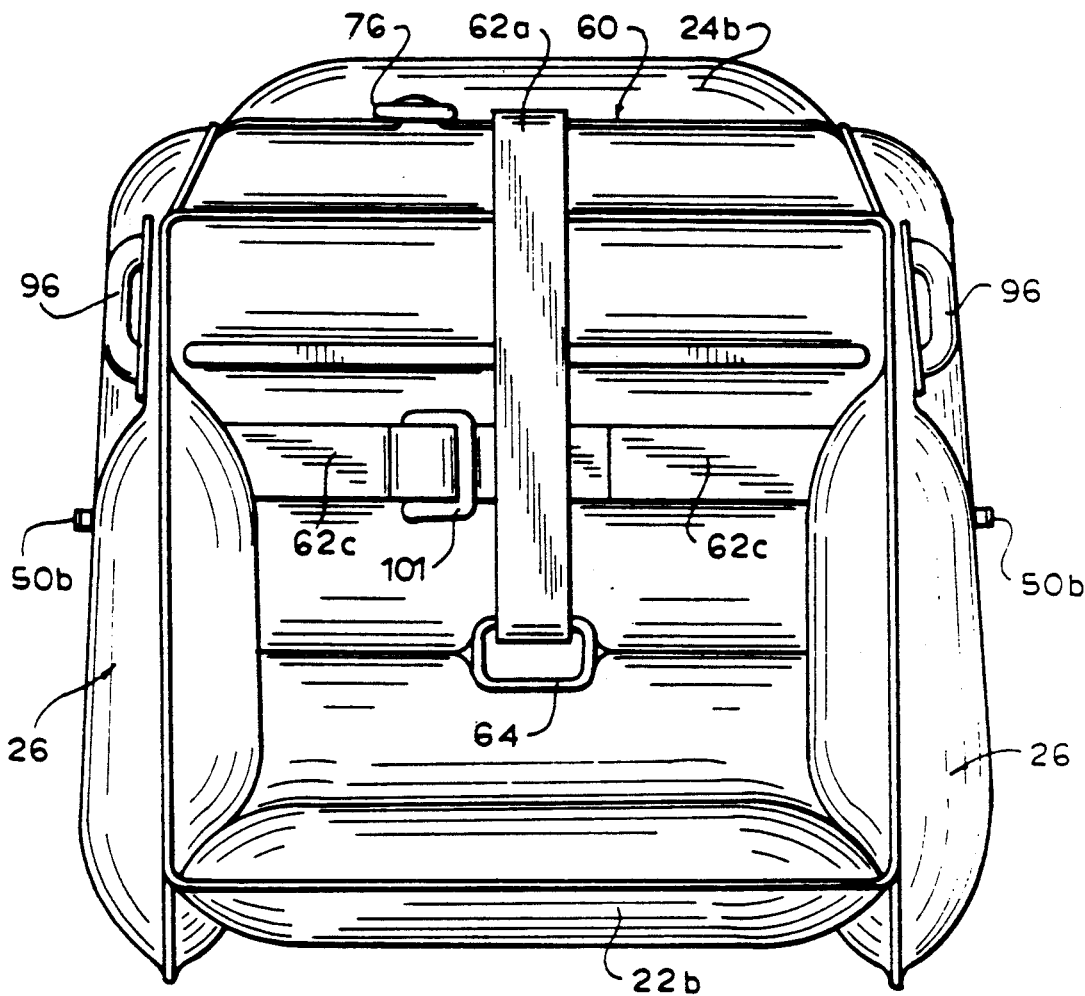

In order to maintain the child within the child seat 20, both against the natural inclination of a child to wander out of any seat and against the inertial forces acting to drive the child out of the seat during an abrupt stop of the vehicle, a releasable harness means is provided for maintaining the torso of the child within the seat 20 and more particularly between the sidewall panels 26 thereof. The continuous harness system used for this purpose includes first releasable strap means, generally designated 60, for maintaining the upper torso of the child in the inflatable child seat intermediate the back sidewall portions 30, and second releasable strap means, generally designated 62, for maintaining the lower torso of the child intermediate the bottom sidewall portions 32. To this end, the bottom panel 22 defines a bottom panel aperture 64 therethrough and the back panel 24 defines at least one, and preferably two, horizontally spaced back panel apertures 66 therethrough. Thus, the second strap means 62 extends behind the seat 20 between the bottom panel aperture 64 and the back panel apertures 66, as best seen in FIGS. 1 and 3, and from the bottom panel aperture 64, in front of the seat intermediate the legs of the child and over its shoulders to the back panel apertures 66, as best seen in FIGS. 2 and 4.

Additionally, each weld line 36 between a sidewall panel 26 and the bottom and back panels 22, 24 is interrupted to define two slots or passageways 69, one slot 69 intermediate the bottom panel 22 and the bottom sidewall portion 32 and one slot 69 intermediate the back panel 24 and the back sidewall Portion 30. These slots 69 enable passage of a strap means 60, 62 therethrough and act to maintain each of the strap means in the desired orientation.

More particularly, the first strap means 60 extends in a horizontal plane about the back panel 24, passing through slots 69 intermediate the back panel 24 and the back sidewall panels 30, thereby to encircle the upper torso of a child in this seat 20. A first fixture means 70, such as a conventional, releasable fastener or buckle 70, is provided for releasably fastening the two functional end portions of the first strap means 60 together across the chest of the child. The physical ends of the first strap means 60 are typically secured to a conventional length-adjusting mechanism 72 (as illustrated in FIG. 3).

A second fixture means, generally designated 74, is provided for releasably fastening the two functional end portions of the second strap means 62 together between the legs of the child. Each of the releasable fixture means 70, 74 typically contains a simple release button or like mechanism which, when depressed, squeezed or otherwise activated, releases the intercoupled portions of the fixture means. The physical ends of the second strap means 62 are typically secured together by a conventional length-adjusting mechanism 76 (as illustrated in FIG. 3). The second fixture means 74 is illustrated as including a female member 80 associated with one functional end portion of the second strap means 62 and configured and dimensioned to receive and engage two separate male members 82 associated with the other functional end portion of the second strap means 62. The female member 80 is engaged by a portion 62a of the second strap means 62 passing intermediate the legs of the child, while the male members 82 are each engaged by one of the shoulder portions 62b of the second strap means 62 descending from the back panel apertures 66 downwardly over the chest of the child.

The path of the second strap means 62 extends at least in a vertical plane from the second fixture means 74 (and, in particular, the female member 80 thereof) downwardly through the bottom panel aperture 64 and then, after passing upwardly behind the seat 20, forwardly through the two back panel apertures 66 and then downwardly and inwardly through the male members 82 of buckle 74. Typically, as illustrated, the second strap means 62 includes two overlapping lengths 62a thereof which overlap in the regions in front of the seat between the female member 84 and the bottom panel aperture 64 and behind the seat from the bottom panel aperture 64 to the length-adjusting mechanism 76 (see FIGS. 2 and 3) and two divergent or substantially non-overlapping lengths 62b which extend behind the seat upwardly from the length-adjusting mechanism 76 through their respective back panel apertures 66 and then downwardly in front of the seat from their respective back panel apertures 66 to where they engage the male members 82 of buckle 74.

The male members 82 of buckle 74 may be fixedly engaged to the second strap lengths 62b and the harness 62 will adequately perform its function. However, in the preferred embodiment of the present invention illustrated, the lengths 62b extend slidably through the male members 82 of buckle 74 to form a portion 62c of the second strap means 62, which portion 62c extends vertically about the bottom panel 22. More particularly, the second strap means portion 62c extends downwardly and outwardly from one male member 82, passes outwardly through one slot 69 intermediate the bottom panel 22 and the bottom sidewall panel 32, extends across the bottom panel 22 under the seat 20, passes inwardly through the other slot 69, and then through the other male member 82, thereby to further assist in maintaining the lower torso of the child intermediate the sidewall panels 26. The two ends of the second strap means portion 62c are preferably slidable relative to the male members 82 of buckle 74, but alternatively may be fixedly secured thereto, if desired.

The first and second strap means 60, 62 are fixably secured together (e.g., by stitching, fasteners, or the like) at at least one point 92, and preferably two points 92, so that the strap means 60, 62 of the harness are continuous and the first harness 60 maintains a desirable spacing of the second strap lengths 62b over the front of the child's chest. The strap means 60, 62 are formed of a strong, flexible material such as reinforced fabric.

It will be appreciated that the overall lengths of the first and second strap means 60, 62 are independently adjustable by means of their respective length-adjusting mechanisms 72, 76. To provide for further flexibility, however, in addition to the back panel apertures 66 already described, an additional pair of back panel apertures 66a may be provided below the apertures 66 so that the second strap means 62 may be passed through the second pair of back panel apertures 66a for a smaller child, the slack thus created in second strap means 62 being taken up by means of the length-adjusting mechanism 76.

Referring now to FIG. 6, therein illustrated is the device 10 in a position of use on a vehicle seat with the bottom panel 22 resting on the seat bottom cushion 14 and the back panel 24 resting on the seat back cushion 16. A child C (illustrated in phantom line) is disposed within the seat 20, and a conventional seat belt 12 secures the device 10 to the vehicle seat (or vehicle frame). Secured to each sidewall panel 26, and as illustrated the outer surface of each intermediate sidewall panel portion 26a, are upper and lower passageways 96, one disposed above and forward of the bracing means 50 and one disposed below and behind the bracing means 50. These passageways 96 are formed of a relatively hard non-inflatable material and are configured and dimensioned to allow passage therethrough of one end of a seatbelt 12 so that the seatbelt end may be passed through the lower and then upper passageways 96 of one side panel 26, passed in front of the stomach of the child, threaded through the upper and then lower Passageways 96 of the other side panel 26, and then secured to the other end of the seatbelt 12 by a conventional seatbelt buckle 98, thereby to secure the device 10 to the vehicle seat. The passageways 96 also serve as convenient handles which enable the device 10 to be transported from one location to another—for example, from a house to the vehicle.

When the vehicle comes to an abrupt stop, inertia causes the device 10 to continue to move in the prior direction of motion of the vehicle (typically, forwardly). This has the same effect as if the seatbelt 12 were suddenly tightened. As the portions 26a of the sidewall panels disposed intermediate the bracing means 50 and the seatbelt 12 are more flexible than the bracing means 50, the tightening seatbelt 12 will cause the aforementioned upper intermediate sidewall portions 26a to fold inwardly and downwardly towards each other so that they will more closely cradle and now also cover the child C within the seat, thereby to briefly limit its movement and shield it from flying glass and like debris during the instant of the accident, even though the child's comfort may briefly suffer due to the closer restraints.

Figure 7:
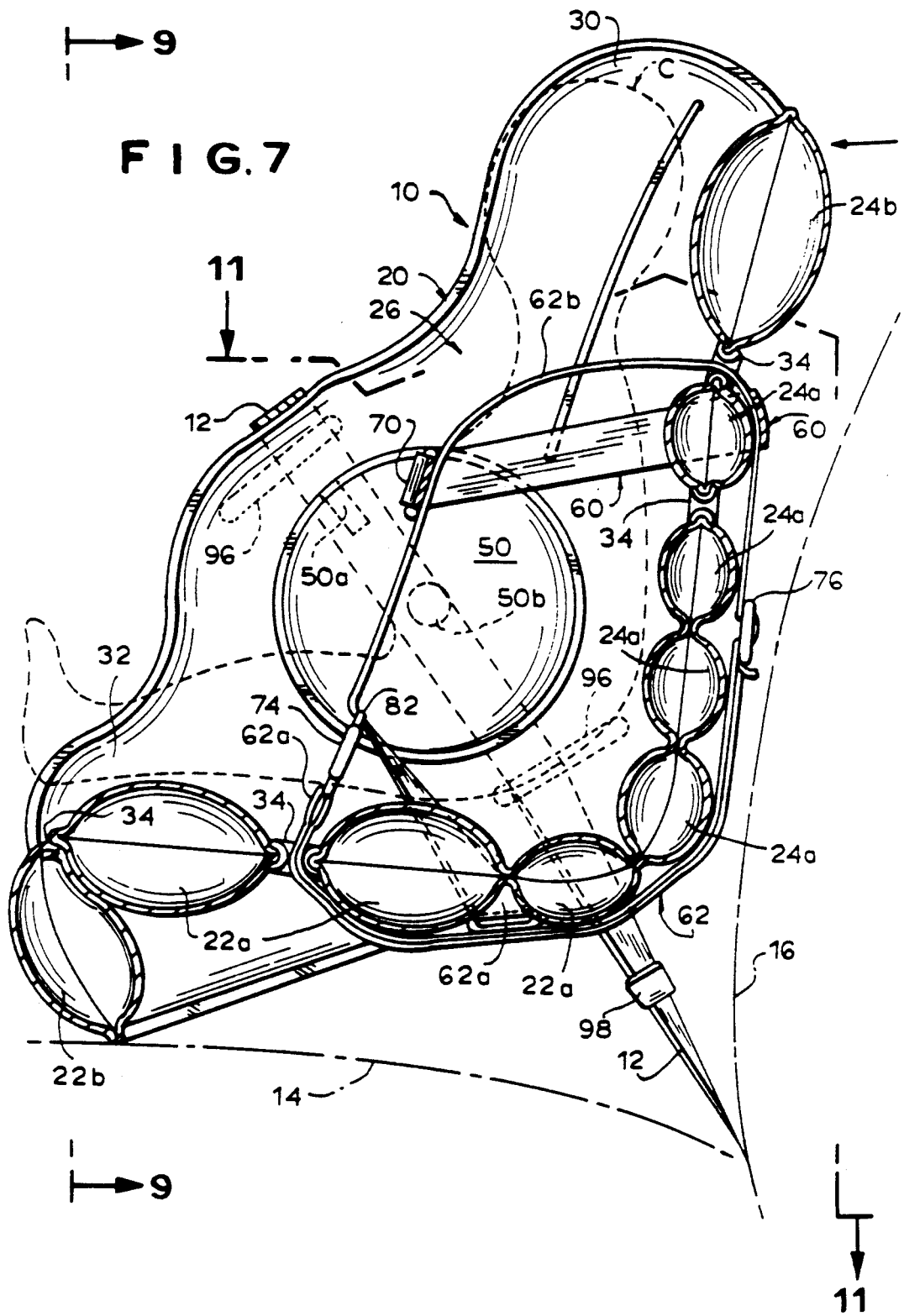
FIG. 7 is a view similar to FIG. 6, but showing the device and child during an abrupt stop of the vehicle.
Figure 8:
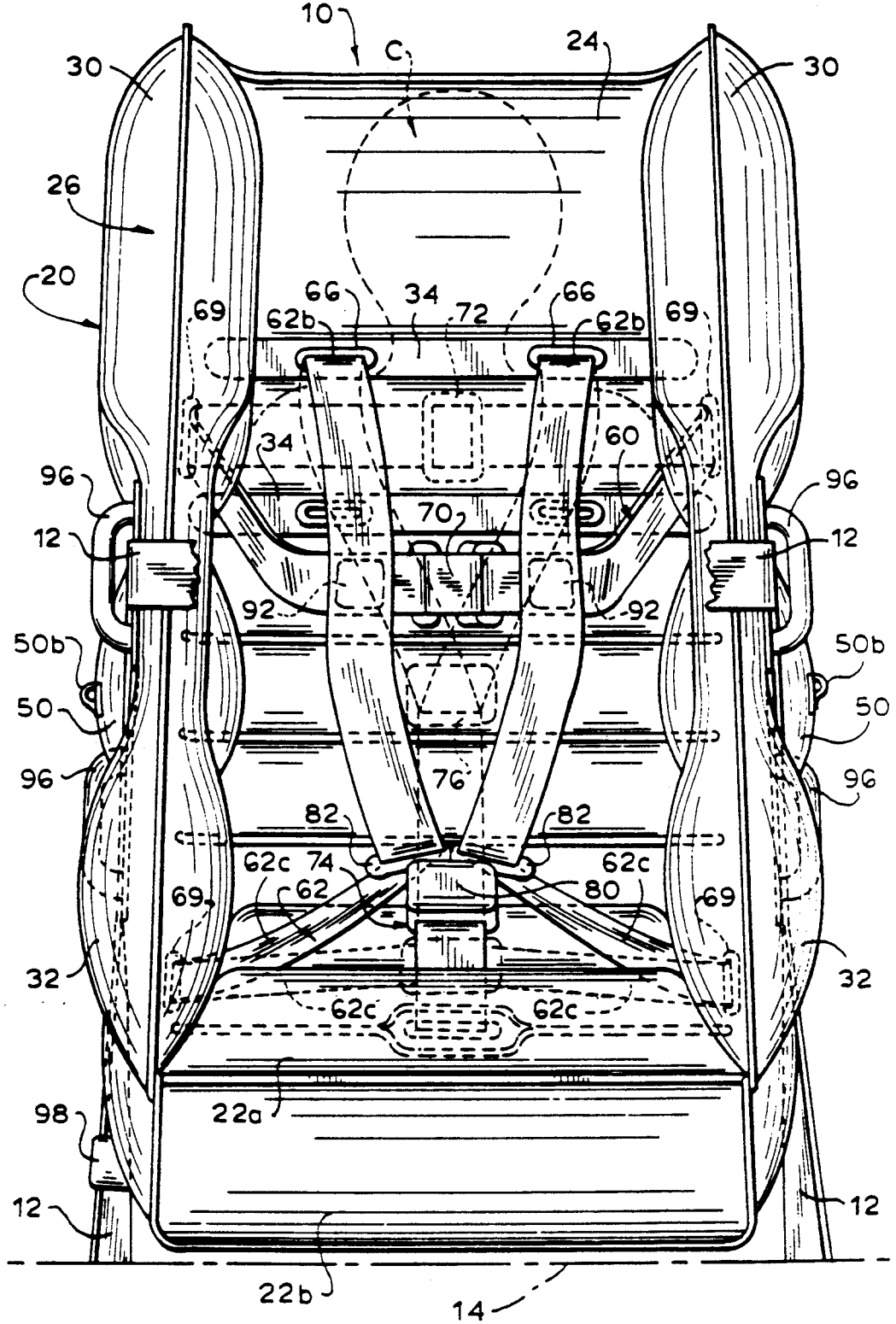
FIG. 8 is a top plan view taken along the line 8—8 of FIG. 6, with a portion of the seatbelt being cut away to reveal details of internal construction.
Figure 9:
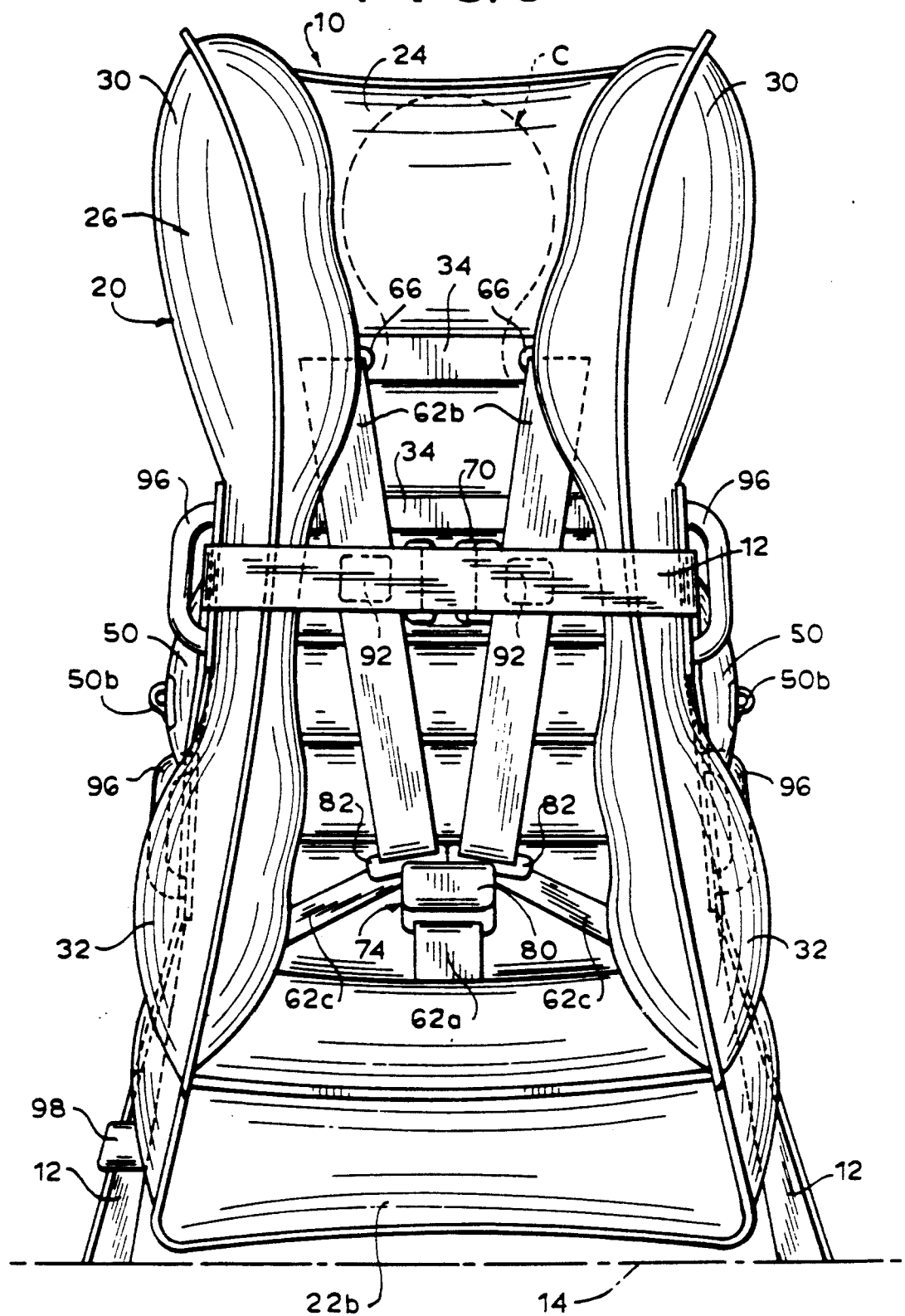
FIG. 9 is a top plan view taken along the line 9—9 of FIG. 7, similar to FIG. 8 but showing the device and child during an abrupt stop.
Figure 11:
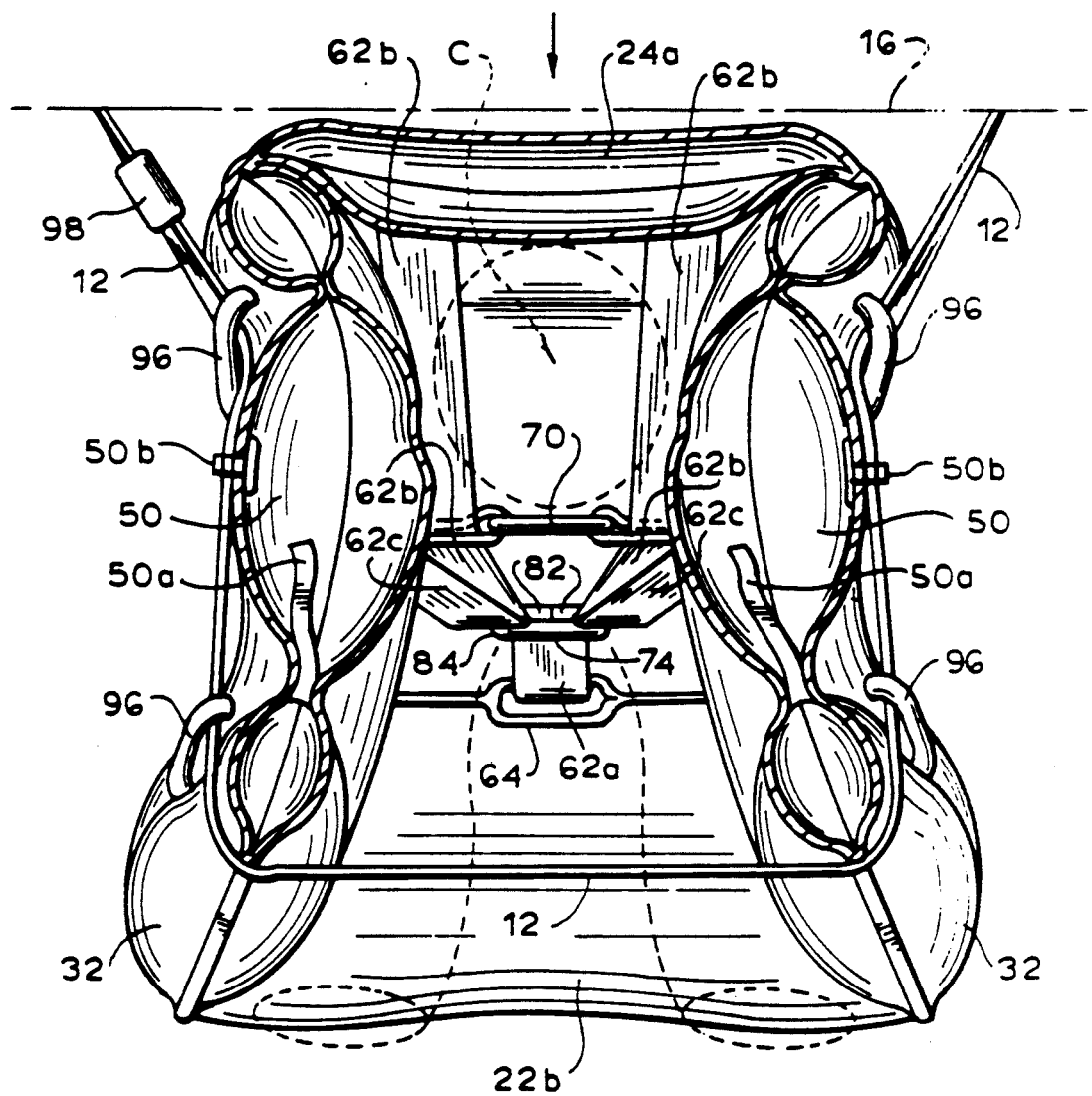
FIG. 11 is a sectional view taken along the line 11—11 of FIG. 7, similar to FIG. 10 but showing the device and child during an abrupt stop.

Referring now to FIGS. 6, 8 and 10, therein illustrated is the device 10 in normal use. By way of contrast, FIGS. 7, 9 and 11 are similar views illustrating the device 10 during an abrupt stop in the forward motion of the vehicle (as might occur during a head-on collision). Relative to FIGS. 6, 8 and 10, FIGS. 7, 9 and 11 show the upper portion of back panel 24 moving away from the back cushion seat 16 and somewhat forwardly and downwardly toward the bottom panel 22. Such motion, especially such motion of the lower portion of back panel 24, is limited by the presence of the bracing means 50 within each sidewall panel 26. Furthermore, the upper connecting sidewall portion 26a of each sidewall panel 26, under and adjacent to the seatbelt 12, as well as adjacent portions of the back and bottom sidewall portions 30, 32, buckle somewhat and are drawn inwardly towards the other by the seatbelt 12 to further limit movement of the child within under the inertial forces of the abrupt stop and to further cushion and protect the child from flying glass, debris and the like.

If desired, a length adjusting mechanism 101 may be provided for the second strap means portion 62c just as the mechanisms 72 and 76 are provided for the first strap means 60 and the second strap means portions 62a, 62b.

The device 10 is simple to use. To inflate the seat 20, air is introduced under pressure via valve 40, either by blowing into it or by using hand, foot or electrically operated pumps. Inflation is completed when the ends of the bracing means 50 reach the convexly rounded shape illustrated in FIG. 2 as a result of the air introduced through valve 40 eventually passing through the collapsible valve 50a. Alternatively, where the embodiment lacks the collapsible valve 50a and utilizes a two-way inflation/deflation valve for the bracing means 50, the inflation/deflation valves may be used to inflate the bracing means 50.

Once inflated, the device 10 may be transported to a car using the upper passageways 96 as handles for carrying the same. Once in the car, the first and second fixture means or buckles 70, 74 are activated to release the various portions thereof. After the child is placed within the inflated seat 20, the first strap means 60 is secured about the chest of the child, with the functional end portions thereof being secured by the first buckle 70. The second strap means portion 62a is disposed between the legs of the child, and the second strap means portions 62b are disposed over the shoulders of the child, and the second strap means portions 62c are disposed over the thighs of the child. The various members 80, 82 of the second buckle 74 are then secured together. This procedure insures that the child will be maintained within the device 10, and more particularly intermediate the sidewall portions 26 thereof, even in the event of an accident. Finally, one end of seatbelt 12 is threaded through the lower and then upper passageways 96 of one sidewall panel 26, passed in front of the stomach of the child, threaded through the upper and then lower passageways 96 of the other sidewall panel 26, and then secured to the other end of the seatbelt 12 by the seatbelt buckle 98.

When the device 10 is not in use, it may be easily deflated using the one-way deflation-only valves 50b (or the two-way bracing means valves, if present) to deflate the bracing means 50 and the two-way inflation/deflation valves 40 to deflate the remaining portions of the inflated seat 20. Deflation may be accomplished by manual squeezing of the parts involved or by the use in reverse of any of the pump-like mechanisms described in connection with the inflation process, i.e., as deflation pumps.

While the inflatable portions of the seat may be formed of nylon or other material affording sufficient strength and gaseous impermeability to meet rigorous safety standards, the upper surface of the bottom panel 22 and the inner surface of the sidewall panels 26 above the bottom panel 22 may be padded or lined with a material which will afford greater comfort to the child within the seat than nylon or plastic by itself. For example, the lining may be formed of a soft, breathable fabric.

Figure 12:
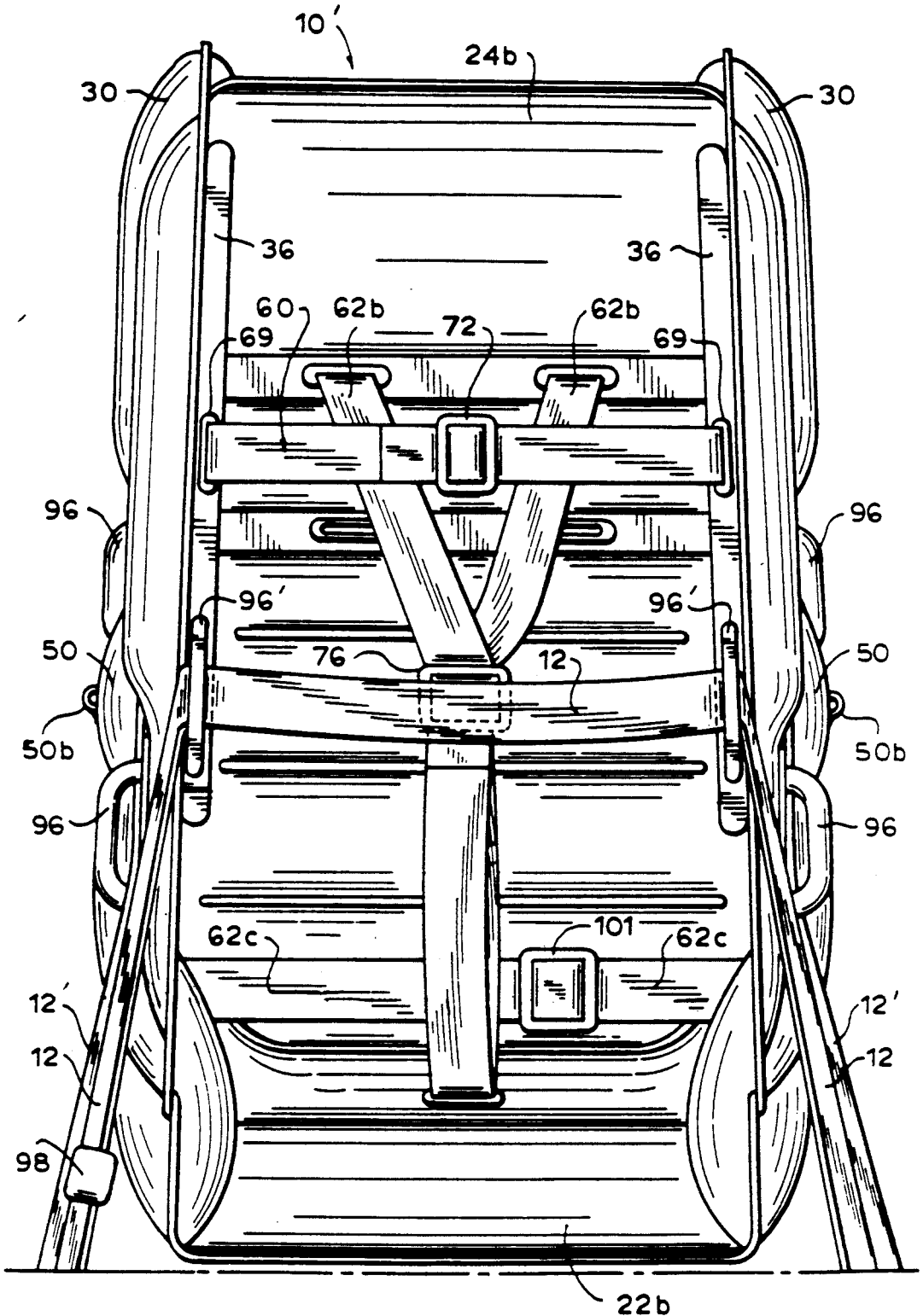
FIG. 12 is a rear elevational view of an alternative embodiment.

Referring now to FIG. 12, an alternative embodiment 10' of the device is intended to be relatively permanently installed in a vehicle. It is similar to the first embodiment 10, except that it incorporates auxiliary passageways 96' projecting outwardly and rearwardly from each sidewall panel 26 or opposite sides of the back panel 24. One end of a normal seatbelt 12 would be passed through the auxiliary passageways 96' and secured to the other seatbelt end by the seatbelt buckle 98, thereby to relatively permanently secure the device 10' to the vehicle seat. Both parts of an auxiliary seatbelt 12' are secured to the main seat belt 12 or vehicle seat (or frame) and then one end is threaded through the main passageways 96 and joined with the other auxiliary seatbelt end by the buckle of the auxiliary seatbelt 12'. This permits the device 10' to remain in position on the vehicle seat regardless of whether or not the auxiliary seatbelt 12' has been left open when not in use by the child.

Referring now to FIGS. 13-17, a second embodiment of the device of the present invention, generally designated 100, includes an inflatable portion which is similar to the inflatable portion of the device 10 except that, instead of inflatable bracing means 50 disposed in the sidewall panels to preclude the upper portion of the back panel from being forcibly displaced forwardly and downwardly (toward the bottom panel) when the vehicle makes an abrupt stop, a rigid frame is employed for the same purpose. Accordingly, elements of the second embodiment 100 will be identified by the same reference numerals used to identify similar elements of the first embodiment 10. However, it will be appreciated by those skilled in the art that the bracing means 50 may be included in the second embodiment 100 as well as the frame for yet added protection against the upper portion of the back panel being driven downwardly and forwardly into the bottom panel when the vehicle comes to an abrupt stop.

The device according to the second embodiment 100 incorporates a frame generally designated 200. The frame 200 comprises a transverse top member 202, a transverse bottom member 204 vertically spaced from said top member 202, and a Pair of horizontally spaced apart longitudinal side members 206 connecting the transverse members 202, 204. To impart even further rigidity to the frame 200, one or more additional transverse members 208 are preferably disposed intermediate the transverse top and bottom members 202, 204 and secured to the longitudinal side members 206 at each end.

Each of the side members 206 defines an ear 210 which extends laterally outwardly of the respective side member 206 and in turn defines an aperture 212 configured and dimensioned to enable passage therethrough of the seatbelt 12 (not shown) including the interlocking fixtures disposed on the free ends of the seatbelt. The passage of the seatbelt 12 through the ear apertures 212 enables the frame 200, and hence the device, 100 to be securely positioned with the bottom panel 22 resting on the seat bottom cushion 14 (not shown) and the back panel 24 resting on the seat back cushion 16 (not shown). The device 200 may be left continuously on the car seat, with the seat belt 12 passing through the ear apertures 212 as the child may be inserted into or removed from the device without separation of the device 100 and the seatbelt 12.

Figure 16:
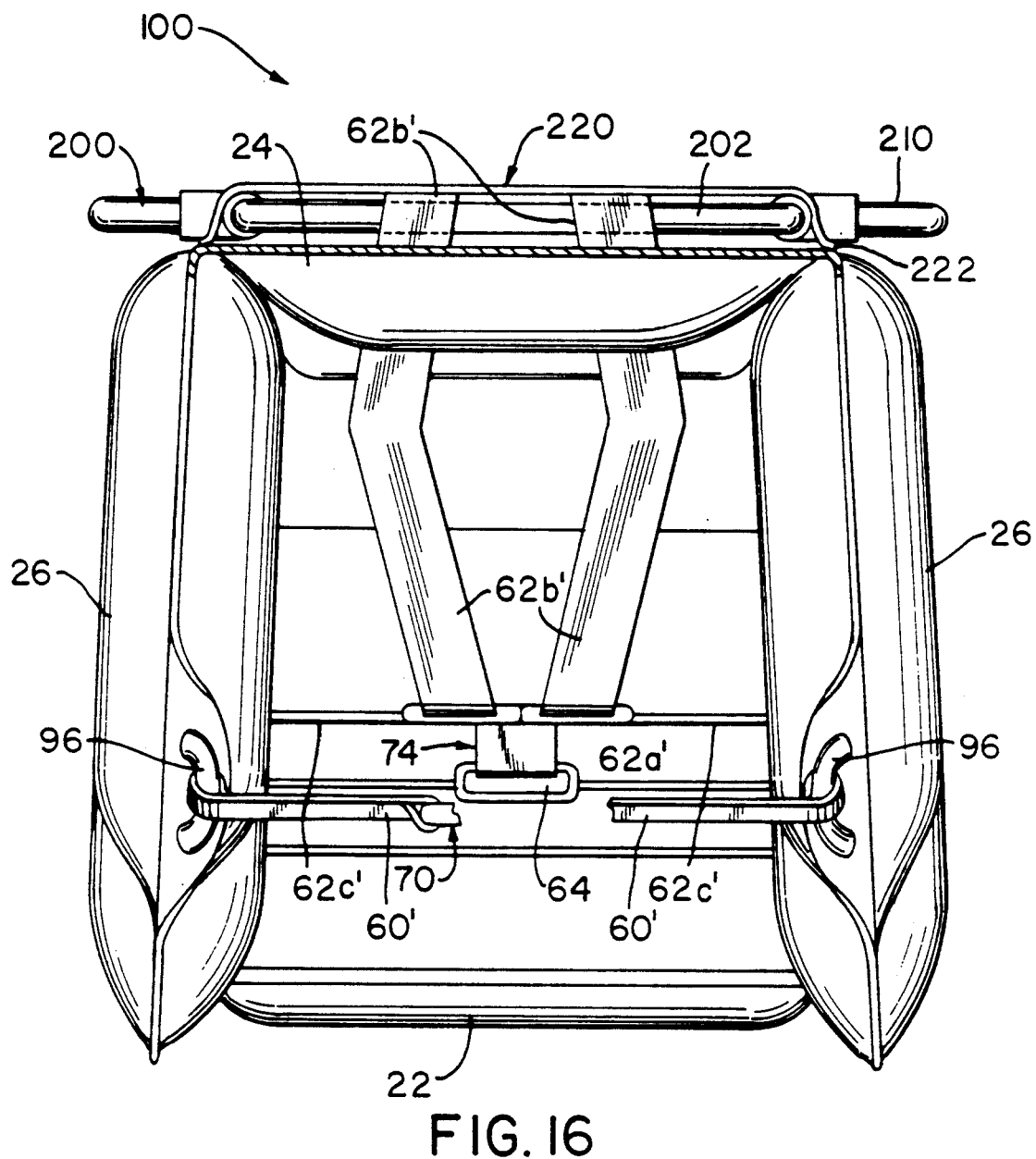
FIG. 16 is a top plan view thereof, partially broken away to reveal details of internal construction.
Figure 17:
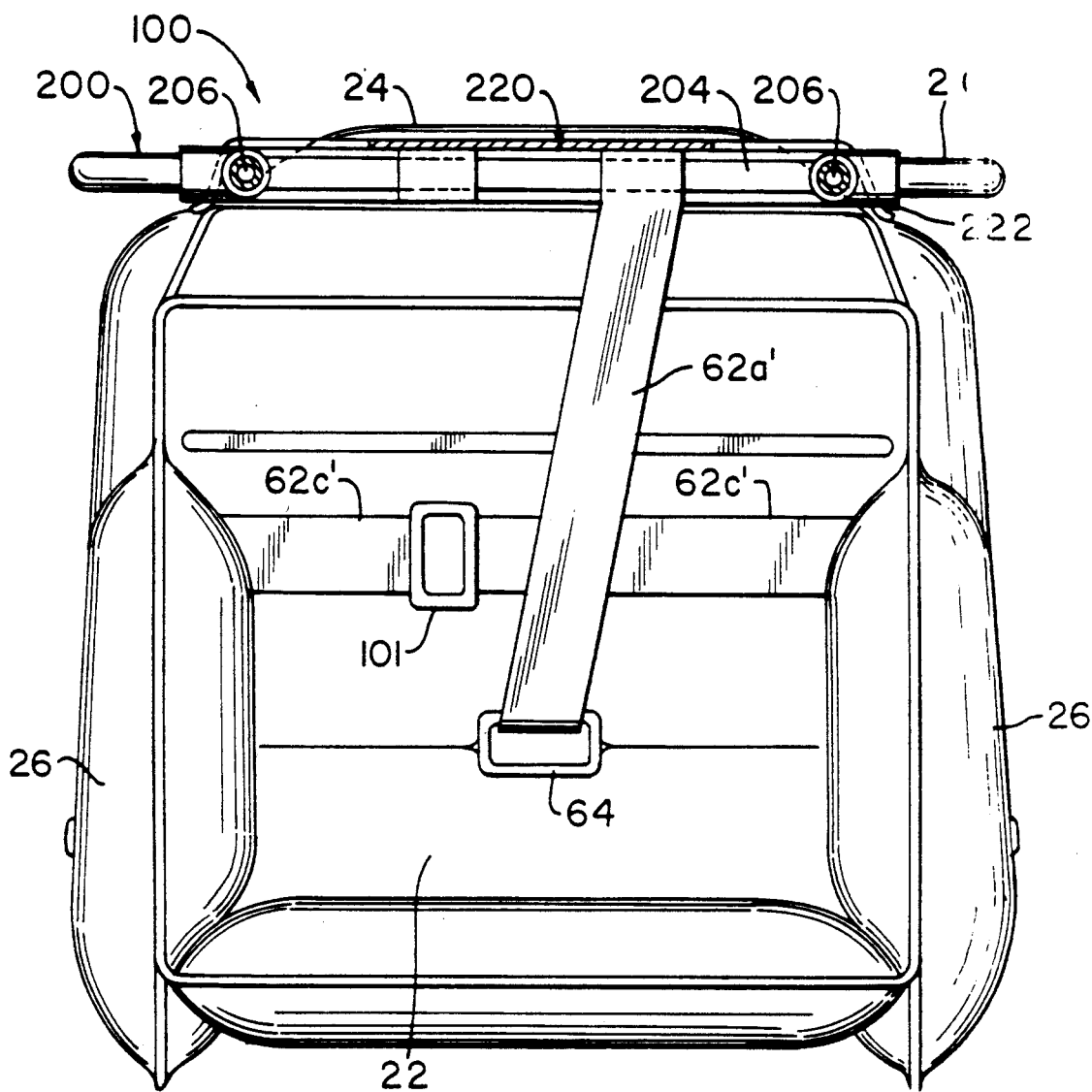
FIG. 17 is a bottom plan view thereof, partially broken away to reveal details of internal construction.

It will be appreciated that the lower passageways 96 of the first embodiment 10 (disposed below and behind the bracing means 50) and the upper passageways 96 (disposed above and forward of the bracing means 50 thereof) are no longer required in order to allow a seatbelt 12 to secure the device to the car seat. However, as illustrated, the upper passageways 96 have been retained, both because they serve as convenient handles to enable transportation of the device 10 from one location to another, and because they enable the first strap means 60 (which in the embodiment 10 extends in a horizontal plane about the entire back panel 24 to encircle the upper torso of a child in the seat 20) to be replaced, as best seen in FIG. 16, by a shorter first strap means 60' which has its extreme ends secured to the passageways 96 and its free ends releasably joinable by a first fixture means 70, such as a conventional releasable fastener or buckle. A conventional length-adjusting mechanism is preferably provided for the first strap means 60'.

A generally rectangular sheet of fabric, generally designated 220, is secured (as by peripheral stitching 222) to the back of the back panel 24. The frame 200 is either fixedly or loosely disposed within the pocket 223 formed by the panel 220 and the back of the back panel 24. The stitching 222 is interrupted at various points to enable passage of the second strap means 62a', 62b' and 62c' therethrough and into the pocket 223 and the ears 210 therethrough and outwardly of the pocket 223.

Figure 13:
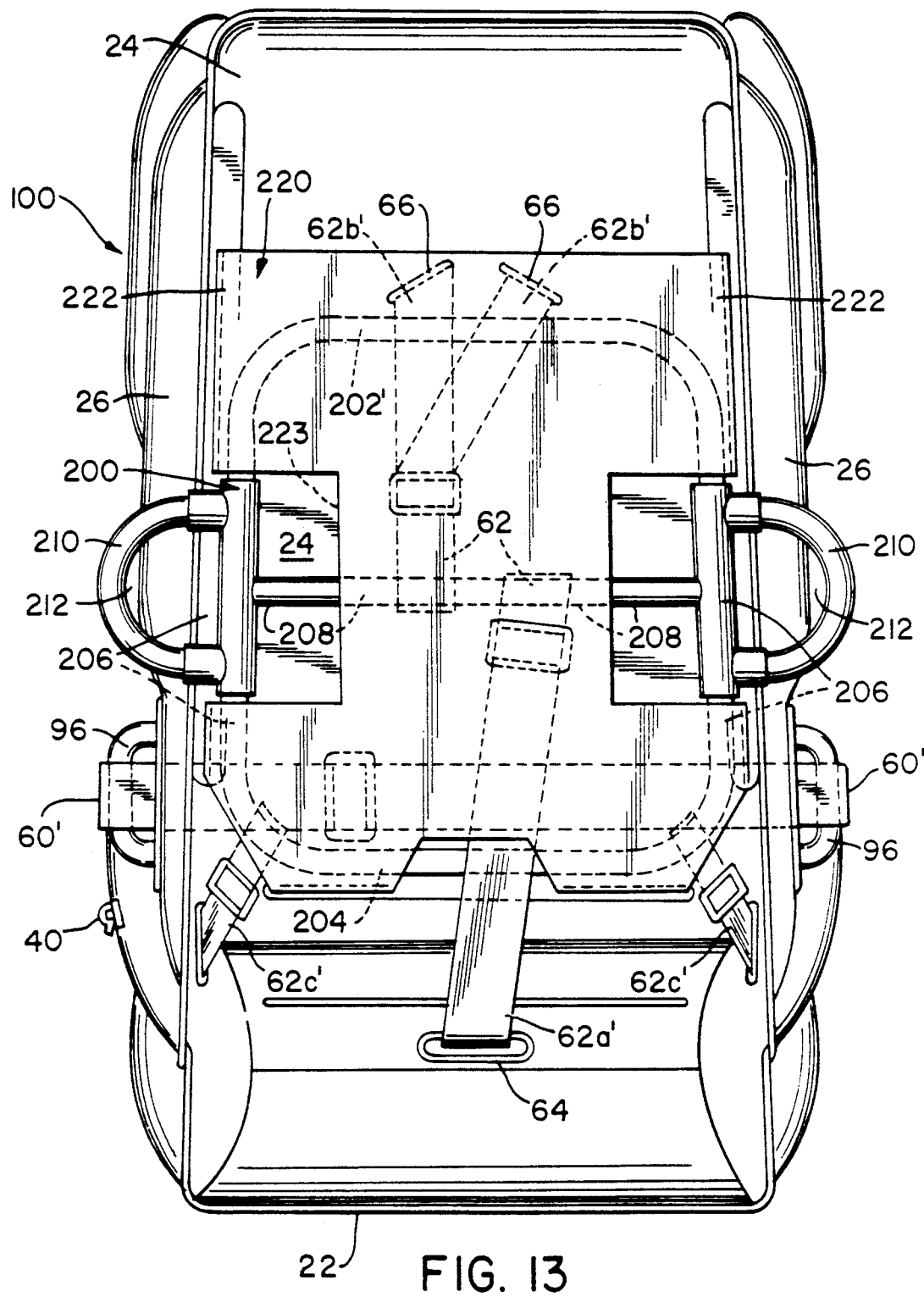
FIG. 13 is a rear elevational view of a second embodiment of the invention incorporating a rigid frame.
Figure 14:
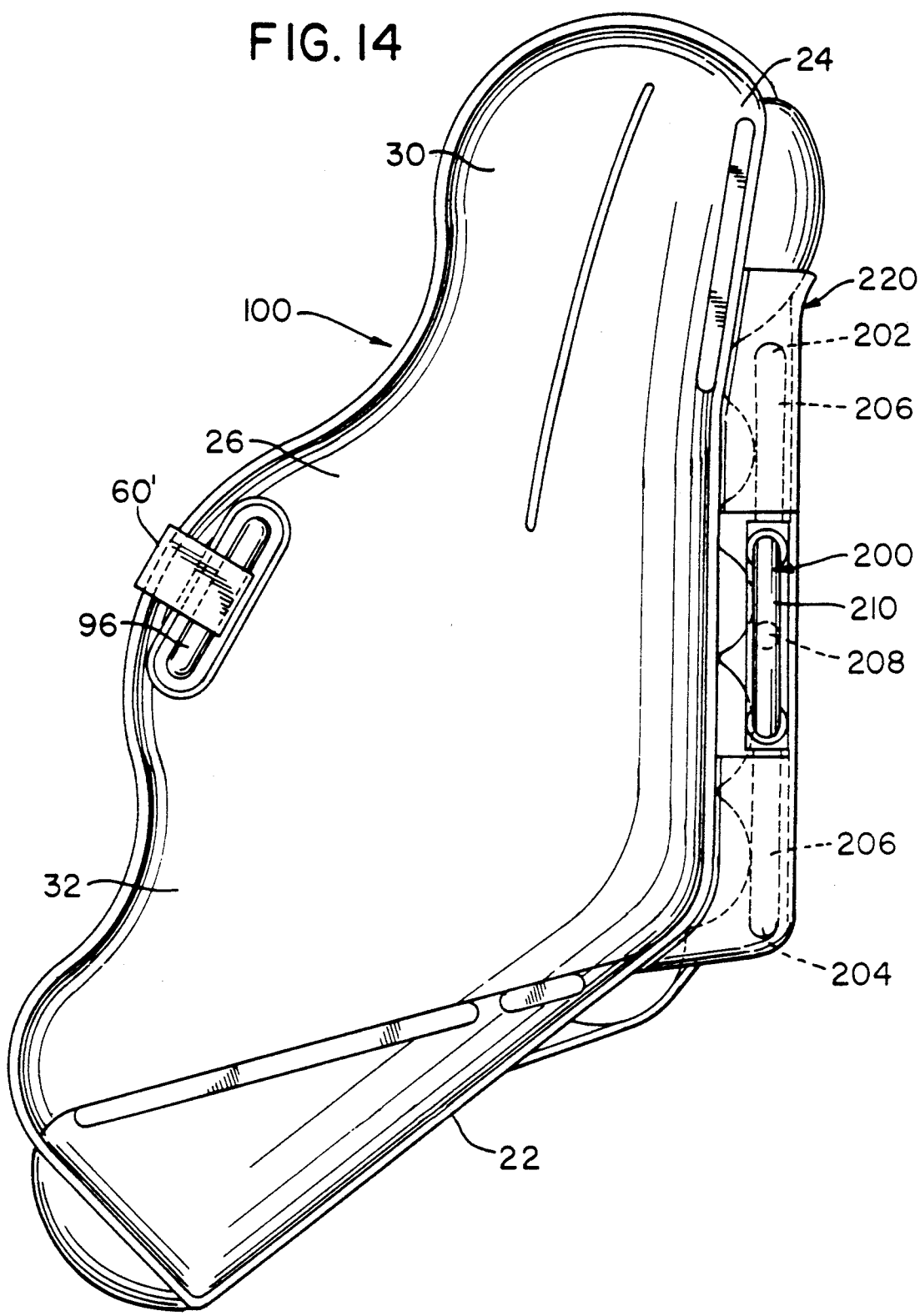
FIG. 14 is a side elevational view thereof.
Figure 15:
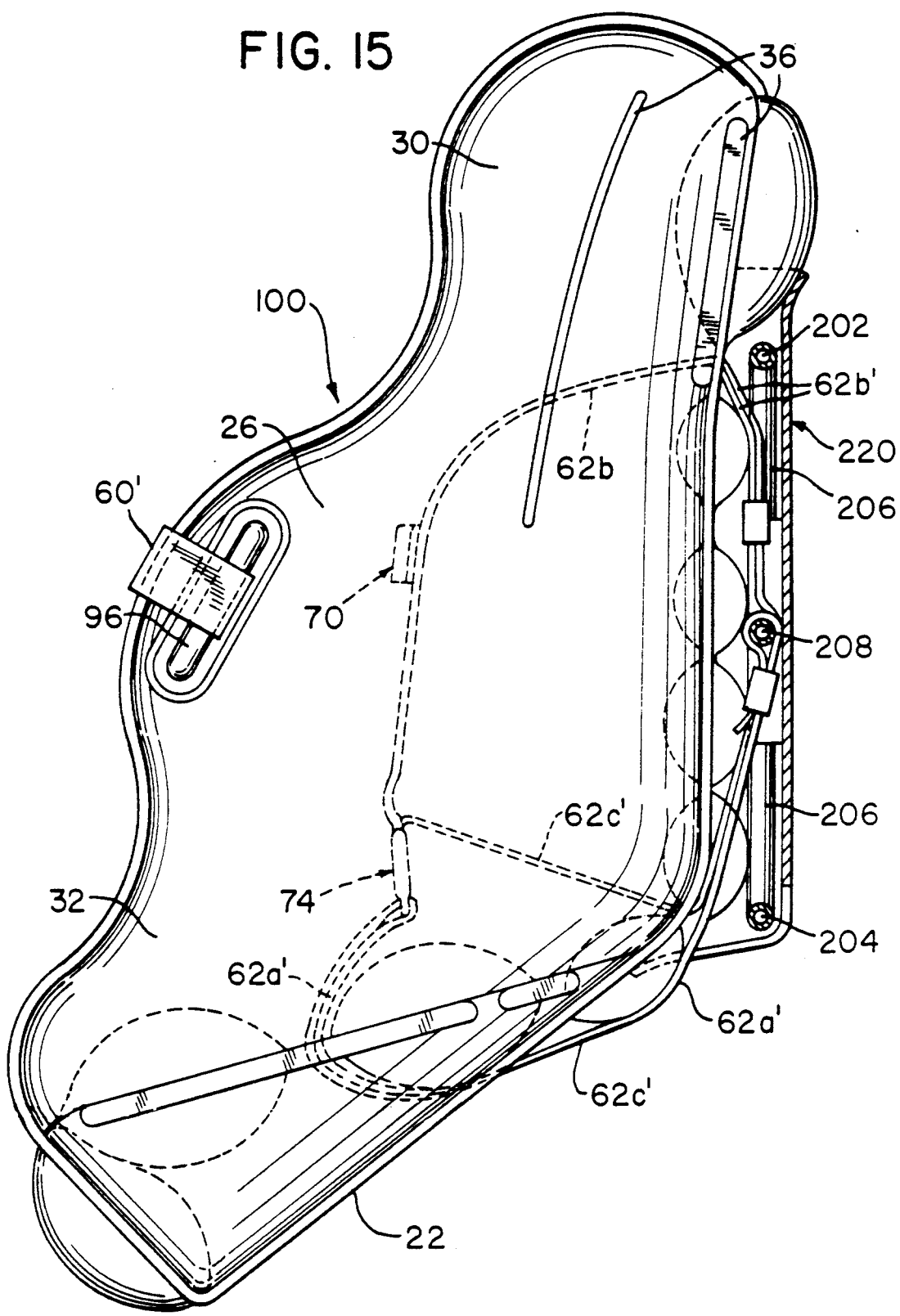
FIG. 15 is a side elevational view similar to FIG. 14 but with portions thereof cut away to reveal details of internal construction.

The second releasable strap means, generally designated 62', of the second embodiment 100, maintains the lower torso of the child intermediate the bottom sidewall portions 32 and is similar to the second releasable strap means 62 of the first embodiment 10 except that it is not continuous with the first strap means 60' (that is, it is not connected thereto by the stitched portions 92 of the first embodiment), and need not itself be continuous. Thus the straps 62a' and 62b' need not be secured to one another behind the seat 20 as in the first embodiment 10; indeed, preferably each is secured to either the same or a different transverse member 202, 204, or, as illustrated, 208 of the frame 200 of the second embodiment 100. As the frame 200 is substantially rigid, it is of little concern whether the straps 62a', 62b' are secured to the same or a different transverse member 202, 204, 208. Additionally, the strap 62c' need not be continuous but may be formed by a separate strap portion, each strap portion having one end secured to the frame 100 (as best seen in FIG. 13) and the other end passing through fixture means 74 and becoming straps 62b'. Further, if desired, the two male members 82 of the fixture means 74 may be of integral unitary one-piece construction since the male members 82 are no longer connected to the first strap means 60 and thus may be easily lifted up (over the head of the child and out of the way) during the child seating and unseating operations.

In the second embodiment 100 the presence of the inflated back panel 22 of the seat intermediate the child and the frame 200 will, under ordinary driving conditions, prevent the child from even feeling the frame so that there is a maximum level of comfort to the child yet, in the event of an accident, the seat affords a maximum level of protection for the child within, regardless of its comfort, during the moment of the accident. The device is easily and compactly stored when not in use, as the deflated portion of the seat cannot itself be folded much smaller than the frame. While the second embodiment remains economical to manufacture and easy to maintain, its weight is substantially higher than the first embodiment, due to the presence of the frame. On the other hand, due to the absence of any separately deflatable bracing means 50 in the second embodiment, the second embodiment may be inflated and deflated conveniently as a unit.

To summarize, the present invention provides a child vehicle seat device which, under normal driving conditions, provides the maximum level of comfort to the child within, yet affords a maximum level of protection for the child within, regardless of its comfort, during the instant of the accident. The device in one embodiment is lightweight, easily and compactly stored when not in use, economical to manufacture, and easy to maintain.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

I claim:

1. A child seat device for use in a vehicle having a seatbelt for securing the device to a vehicle seat, comprising:
   (A) an inflatable child seat including
      (i) an inflatable bottom panel;
      (ii) an inflatable back panel upstanding from the rear of said bottom panel;
      (iii) a pair of opposed, laterally spaced inflatable sidewall panels, each of said sidewall panels having a back portion projecting forwardly from a respective side of said back panel and a bottom portion projecting upwardly from a respective side of said bottom panel;
   (B) releasable harness means for maintaining the torso of a child intermediate said sidewall panels; and
   (C) a substantially rigid frame secured to said back panel for movement therewith as a unit, said frame defining a pair of apertures configured and dimensioned to receive therethrough a seatbelt, thereby to secure the device to the vehicle seat.

2. The device of claim 1 wherein said pair of apertures are horizontally spaced apart.

3. The device of claim 2 wherein said pair of apertures extend laterally of said back panel.

4. The device of claim 1 wherein said frame is disposed adjacent the back of said back panel.

5. The device of claim 1 wherein said frame extends over substantially the entire width of said back panel.

6. The device of claim 1 wherein said frame extends over at least 50% of the height of said back panel.

7. The device of claim 1 wherein said frame defines a periphery having right and left vertical side members and top and bottom transverse members, at least one intermediate transverse member intermediate said top and bottom transverse members and connecting said right and left vertical side members, and a pair of ears extending laterally outwardly from said vertical side members and defining said apertures.

8. The device of claim 7 wherein opposite ends of said harness means are secured to different transverse member of said frame.

9. The device of claim 1 wherein opposite ends of said harness means are secured to said frame.

10. A child seat device for use in a vehicle having a seatbelt for securing the device to a vehicle seat, comprising:
(A) an inflatable child seat including
 (i) an inflatable bottom panel;
 (ii) an inflatable back panel upstanding from the rear of said bottom panel;
 (iii) a pair of opposed, laterally spaced inflatable sidewall panels, each of said sidewall panels having a back portion projecting forwardly from a respective side of said back panel and a bottom portion projecting upwardly from a respective side of said bottom panel;
(B) releasable harness means for maintaining the torso of a child intermediate said sidewall panels; and
(C) a substantially rigid frame secured to and disposed adjacent the back of said back panel for movement therewith as a unit, said frame extending over substantially the entire width of said back panel and over at least 50% of the height of said back panel, said frame defining a pair of horizontally spaced apart apertures extending laterally of said back panel configured and dimensioned to receive therethrough a seatbelt, thereby to secure the device to the vehicle seat, said frame defining a periphery having a pair of spaced apart vertical side members, top and bottom transverse members connecting said vertical side members, at least one intermediate transverse member intermediate said top and bottom transverse members and connecting said vertical side members, and a pair of ears extending laterally outwardly from said vertical side members and defining said apertures;
opposite ends of said harness means being secured to different transverse members of said frame.

* * * * *